J. P. ZIMMER.
PIPE OR CULVERT JOINT.
APPLICATION FILED NOV. 6, 1908.
914,909.
Patented Mar. 9, 1909.
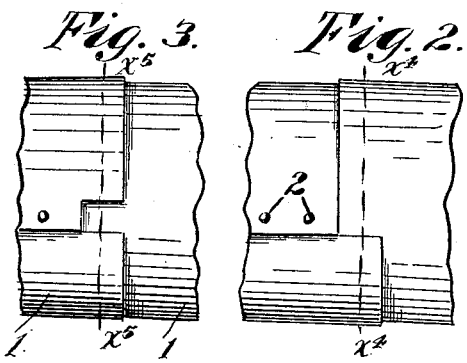
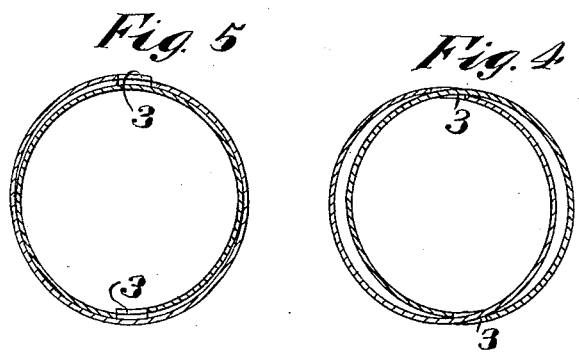
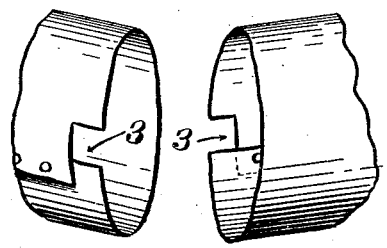

UNITED STATES PATENT OFFICE.

JOHN P. ZIMMER, OF MINNEAPOLIS, MINNESOTA, ASSIGNOR OF ONE-HALF TO JEROME E. STOWALL, OF MINNEAPOLIS, MINNESOTA.

PIPE OR CULVERT JOINT.

No. 914,909.  Specification of Letters Patent.  Patented March 9, 1909.

Application filed November 6, 1908. Serial No. 461,299.

*To all whom it may concern:*

Be it known that I, JOHN P. ZIMMER, a citizen of the United States, residing at Minneapolis, in the county of Hennepin and State of Minnesota, have invented certain new and useful Improvements in Pipe or Culvert Joints; and I do hereby declare the following to be a full, clear, and exact description of the invention, such as will enable others skilled in the art to which it appertains to make and use the same.

My invention has for its object to provide improved means for connecting the ends of pipe sections, and to this end, it consists of the novel devices and combinations of devices hereinafter described and defined in the claim.

The invention is illustrated in the accompanying drawings wherein like characters indicate like parts throughout the several views.

Referring to the drawings: Figure 1 is a fragmentary view in perspective, showing two pipe sections designed in accordance with my invention and brought into positions ready to be connected; Fig. 2 is a plan view of the two pipe sections shown in Fig. 1, showing the same connected and slightly turned; Fig. 3 is a view corresponding to Fig. 2, but showing the two pipe sections turned into properly coupled positions; Figs. 4 and 5 are sections taken, respectively, on the lines $x^4$ $x^4$ of Fig. 2 and $x^5$ $x^5$ of Fig. 3.

The pipe sections 1 are formed of metal sheets bent into cylindrical form with their longitudinal edges overlapped and connected by rivets 2. The rivets 2 are applied to the extreme end portions of the pipe sections, and the overlapping edges of the said pipe sections are preferably bent so that they slightly flare, and thus make it an easy matter to enter the ends of an abutting pipe section between the overlapped fold thereof. The abutting ends of both pipe sections are preferably made alike. To facilitate the connection to the two pipe sections by telescopic movement, each pipe section, at each end, has one of its longitudinal extended overlapping portions notched or cut away at 3, as best shown in Fig. 1. When these two pipe sections are to be connected, they are preferably positioned in axial alinement with their notches 3 turned approximately 180 degrees from each other or diametrically opposite, and then the edge portions of the two sections are inserted in the notches 3, and are then rotated approximately into the position shown in Fig. 3, in which latter position, the notches 3 are tightly closed by the uncut end portions of the coupled sections.

Pipe sections constructed as above described, may be quickly coupled together and quickly taken apart, and when coupled, a very tight joint between the two sections is formed. Furthermore, this construction adds nothing to the ordinary cost of the pipe sections.

The invention above described may be used wherever sheet metal pipe sections are to be coupled together, but will be found especially serviceable for stove pipes and for culvert and drain pipes. If desired, the pipe sections may be permanently connected by rivets applied to their telescoped ends, but in most instances, this will not be found necessary. In culvert pipe construction, the sections would usually be made of corrugated metal sheets with the corrugations running circumferentially of the pipe sections.

It is important to note that the two pipe sections are of the same diameter, and that after their ends are telescoped together and the one rotated in respect to the other, the end of the outer pipe section will be slightly expanded while the end of the inner pipe section will be slightly contracted, thus forming an extremely tight and close joint.

What I claim is:

In a sheet metal pipe, the combination of telescoping sections, the coöperating ends of said sections formed with notches, the notches of each section adapted to receive a portion of the end of the coöperating section whereby said sections may be connected by rotation.

In testimony whereof I affix my signature in presence of two witnesses.

JOHN P. ZIMMER.

Witnesses:
  H. D. KILGORE,
  FRANK D. MERCHANT.